US007870236B2

(12) United States Patent
Yu

(10) Patent No.: US 7,870,236 B2
(45) Date of Patent: Jan. 11, 2011

(54) METHOD FOR ACCESSING INTERNET USING INTERNET TV

(75) Inventor: Won Uk Yu, Daegu (KR)

(73) Assignee: LG Electronics Inc., Seoul (KR)

( * ) Notice: Subject to any disclaimer, the term of this patent is extended or adjusted under 35 U.S.C. 154(b) by 933 days.

(21) Appl. No.: 09/996,718

(22) Filed: Nov. 30, 2001

(65) Prior Publication Data

US 2002/0069286 A1  Jun. 6, 2002

(30) Foreign Application Priority Data

Dec. 4, 2000  (KR) .............................. 2000-72949

(51) Int. Cl.
 *G06F 15/177* (2006.01)
(52) U.S. Cl. ...................... 709/221; 709/203; 709/208; 709/217; 709/219; 709/220; 709/222; 709/226; 709/229
(58) Field of Classification Search ................ 709/229, 709/217, 224, 225, 223, 203, 208, 219, 220–222, 709/226; 713/161, 170, 171, 176
See application file for complete search history.

(56) References Cited

U.S. PATENT DOCUMENTS

| 5,091,942 | A | * | 2/1992 | Dent ............................ 380/46 |
| 5,335,278 | A | * | 8/1994 | Matchett et al. ............. 380/248 |
| 5,721,780 | A | * | 2/1998 | Ensor et al. .................. 713/155 |
| 5,862,339 | A | * | 1/1999 | Bonnaure et al. ........... 709/227 |
| 5,983,273 | A | * | 11/1999 | White et al. ................. 709/229 |
| 6,026,435 | A | * | 2/2000 | Enomoto et al. ............ 709/217 |
| 6,088,451 | A | * | 7/2000 | He et al. ....................... 726/8 |
| 6,119,160 | A | * | 9/2000 | Zhang et al. ................ 709/224 |
| 6,154,741 | A | * | 11/2000 | Feldman ........................ 707/9 |
| 6,182,094 | B1 | * | 1/2001 | Humpleman et al. ........ 715/513 |
| 6,199,114 | B1 | * | 3/2001 | White et al. ................. 709/229 |
| 6,269,481 | B1 | * | 7/2001 | Perlman et al. ............. 717/178 |
| 6,449,651 | B1 | * | 9/2002 | Dorfman et al. ............ 709/229 |
| 6,466,971 | B1 | * | 10/2002 | Humpleman et al. ........ 709/220 |
| 6,658,254 | B1 | * | 12/2003 | Purdy et al. ................. 455/445 |
| 6,785,716 | B1 | * | 8/2004 | Nobakht ...................... 709/219 |
| 6,820,157 | B1 | * | 11/2004 | Eide et al. .................... 710/303 |
| 6,851,060 | B1 | * | 2/2005 | Shrader ......................... 726/10 |
| 7,634,424 | B2 | * | 12/2009 | Steinman et al. ............... 463/1 |
| 2001/0010046 | A1 | * | 7/2001 | Muyres et al. ................. 705/52 |
| 2002/0059629 | A1 | * | 5/2002 | Markel ......................... 725/100 |

(Continued)

*Primary Examiner*—Dohm Chankong
(74) *Attorney, Agent, or Firm*—KED & Associates, LLP

(57) ABSTRACT

A method for accessing the Internet using an Internet TV is provided. A function of accessing the Internet and a function of receiving a TV broadcast signal may be combined in the Internet TV, and a server operates a portal site which provides a variety of information to the Internet TV. In order for a server operating a portal site to provide an authentication number to the Internet TV which allows the Internet TV to automatically access the server, the Internet TV transmits a message requesting the authentication of the use of information to the portal server, and the server responds by requesting the Internet TV to input an authentication number. After the Internet TV has transmitted the requested authentication number to the portal server and the server has checked the transmitted authentication number, information is provided to the Internet TV. Because the portal server provides the authentication number to each Internet TV, the portal server is able to confirm the access authority of each Internet TV, thus allowing each Internet TV to automatically access the portal server without an individual user login.

9 Claims, 9 Drawing Sheets

U.S. PATENT DOCUMENTS

2002/0065935 A1* 5/2002 Koperda et al. ............. 709/238
2003/0095791 A1* 5/2003 Barton et al. ................. 386/83
2004/0172366 A1* 9/2004 Muto et al. .................... 705/52
2004/0249726 A1* 12/2004 Linehan ....................... 705/26

* cited by examiner

FIG. 3
CONVENTIONAL ART

USER INFORMATION INPUT SCREEN

INPUT FOLLOWING ITEMS IN ORDER TO CONFIRM MEMBER

USER ID:

NAME:

CONFIRMATION

FIG. 7

AUTHENTICATION NUMBER GENERATION RULE

| MODEL NUMBER | YEAR | MONTH | SERIAL NUMBER | CHECK SUM |
|---|---|---|---|---|
| 0100 | 00 | 11 | 00001 | 0 |

CALCULATE CHECK SUM

```
0 1 0 0 0 0 1 1 0 0  0  0  1
1 2 3 4 5 6 7 8 9 10 11 12 13
```

$2 + 7 + 8 + 13 = 30$ $\boxed{30}$ / 10 REMAINDER ⟶ CHECK SUM

METHOD FOR ACCESSING INTERNET USING INTERNET TV

BACKGROUND OF THE INVENTION

1. Field of the Invention

The present invention relates to a method for accessing the Internet using an Internet TV, and more particularly, to a method for accessing the Internet using an Internet TV, in which an authentication number is provided to the Internet TV by a server operating a portal site, to thus automatically access the server.

2. Description of the Background Art

Recently, the efficiency of works improves and life-styles change due to the rapid growth of information communication technologies. That is, a network having data transmission speed of several Mbit/sec is installed at home with rapid spread of a very high-speed communication network. Accordingly, it is possible to easily transmit and receive moving picture information of high picture quality and high performance at home. Also, with wide spread of a mobile communication terminal, it is possible to easily access the Internet using the terminal. Development of the Internet TV, in which a function of accessing the Internet and a function of receiving TV broadcast are combined with each other, has actively proceeded with the growth of the information communication technologies.

The Internet TV that is a next generation TV, in which modem apparatuses such as a cable modem, a local area network (LAN), an asymmetric digital subscriber line (ADSL) modem, and a telephone line modem are loaded, can freely access an external network as well as can perform a common TV function.

The Internet TV is divided into an armored type connected to a personal computer (PC) and a built-in type, in which various apparatuses and modems that can access the Internet are loaded and software for operating the above apparatuses are installed. The technology of the built-in Internet TV is more difficult than the technology of the armored Internet TV. However, the picture quality of the built-in type Internet TV is excellent and the manipulation of the built-in type Internet TV is convenient since red, green, and blue (RGB) input terminals can be used as they are.

Development of a method for accessing the Internet has actively proceeded together with the development of the Internet TV.

FIG. 1 is a block diagram showing an Internet TV system according to the conventional technology.

As shown in FIG. 1, the Internet TV system includes an Internet TV 100, in which the function of accessing the Internet and the function of receiving the TV are combined with each other, and a server 200 for operating a portal site for providing various information items such as a moving picture service and various text information items to the Internet TV 100 through the Internet.

A method for accessing the Internet using the Internet TV according to the conventional technology will now be described with reference to attached drawings.

The Internet TV 100 transmits an access request message to the server for operating the portal site (a portal server) 200 through the Internet in order to access the portal server (S210). At this time, when the portal server 200 receives the access request message, the portal server 200 transmits a user information input screen to the Internet TV in order to confirm that a user is the legal user (S220). The user information input screen is formed to receive the ID and the name of a user using the Java Script as shown in FIG. 3.

When the user information input screen is transmitted from the portal server 200, the Internet TV 100 receives user information from the user to the user information input screen and transmits the screen to the portal server 200 again (S230). When the user information transmitted from the Internet TV 100 is legal, the portal server 200 allows the Internet TV to access the portal server 200 and provides information to the Internet TV (S240).

However, the users of the Internet TV 100 are restricted since the Internet TV 100 is installed at home. Therefore, according to the conventional method for accessing the Internet using the Internet TV 100, a user login must be performed whenever the Internet TV 100 is turned on.

Also, the portal server 200 for providing the portal site checks a fee for using the portal site with respect to each user. In the case of common households, it is not efficient to charge each user for the fee.

SUMMARY OF THE INVENTION

Therefore, an object of the present invention is to provide a method for each Internet TV automatically accessing a portal server without a user login by the portal server providing an authentication number to each Internet TV so that the portal server confirms the access authority of the Internet TV.

Another object of the present invention is to provide a method for charging a fee for use of the Internet TV according to time, for which the Internet TV is used, without separately charging each user for the fee for the use of the Internet TV.

To achieve these and other advantages and in accordance with the purpose of the present invention, as embodied and broadly described herein, there is provided a method for accessing the Internet using the Internet TV in an Internet TV system comprising the Internet TV, in which a function of accessing the Internet and a function of receiving TV broadcast are combined with each other and a server for operating a portal site for providing various information items (a portal server) to the Internet TV, the method comprising the steps of transmitting a message for requesting the authentication of the use of information to the portal server, requesting the Internet TV to input an authentication number, transmitting the requested authentication number to the portal server, and checking the transmitted authentication number, to thus provide information to the Internet TV.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 shows an example of a user information input screen according to the conventional technology;

FIG. 7 shows an example a method for generating and confirming an authentication number according to the present invention.

DETAILED DESCRIPTION OF THE PREFERRED EMBODIMENTS

Figure 1:
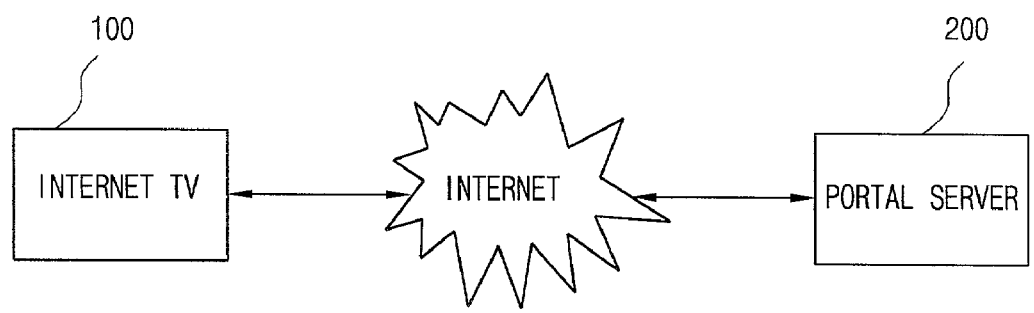
FIG. 1 is a block diagram showing an Internet TV system according to the conventional technology.

The Internet TV system shown in FIG. 1 is used as it is according to the present invention.

A method for accessing the Internet using an Internet TV according to the present invention will now be described with reference to the attached drawings.

Figure 4:
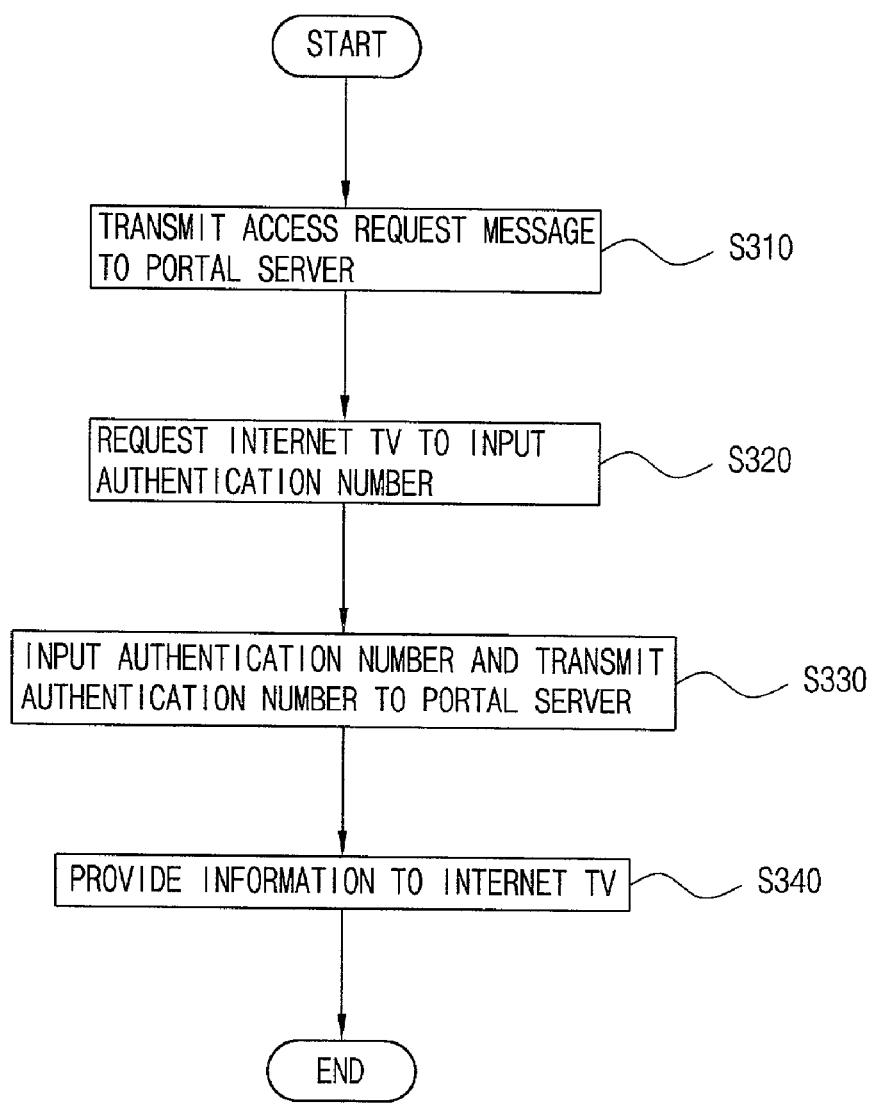
FIG. 4 is a flowchart describing a method for the Internet TV accessing the portal server according to the present invention.

As shown in FIG. 4, an Internet TV 100 transmits an access request message to a portal server 200 in order to access the portal server 200 (S310). At this time, when the portal server 200 receives the access request message, the portal server 200 requests an authentication number to the Internet TV 100 in order to let the Internet TV 100 automatically access the portal server 200 (S320). The authentication number is formed by combining with numbers such as the model name, the manufacturing year, and the manufacturing month of the Internet TV 100.

When the authentication number is requested, the Internet TV 100 reads the requested authentication number from a memory apparatus built-in the Internet TV 100 and transmits the authentication number to the portal server 200 (S330). The portal server 200 receives the authentication number and examines whether there exists an error in the authentication number. When there exists no error, the portal server 200 transmits a main screen to the Internet TV 100 and allows a user to use information (S340).

Processes of the Internet TV 100 accessing the portal server 200 and processes of the portal server 200 allowing the Internet TV 100 to access the portal server 200 in the method for accessing the Internet using the Internet TV 100 according to the present invention will now be described in detail on the basis of the above schematic description.

(Processes of the Portal Server Allowing the Internet TV to Access the Portal Server)

Figure 5:
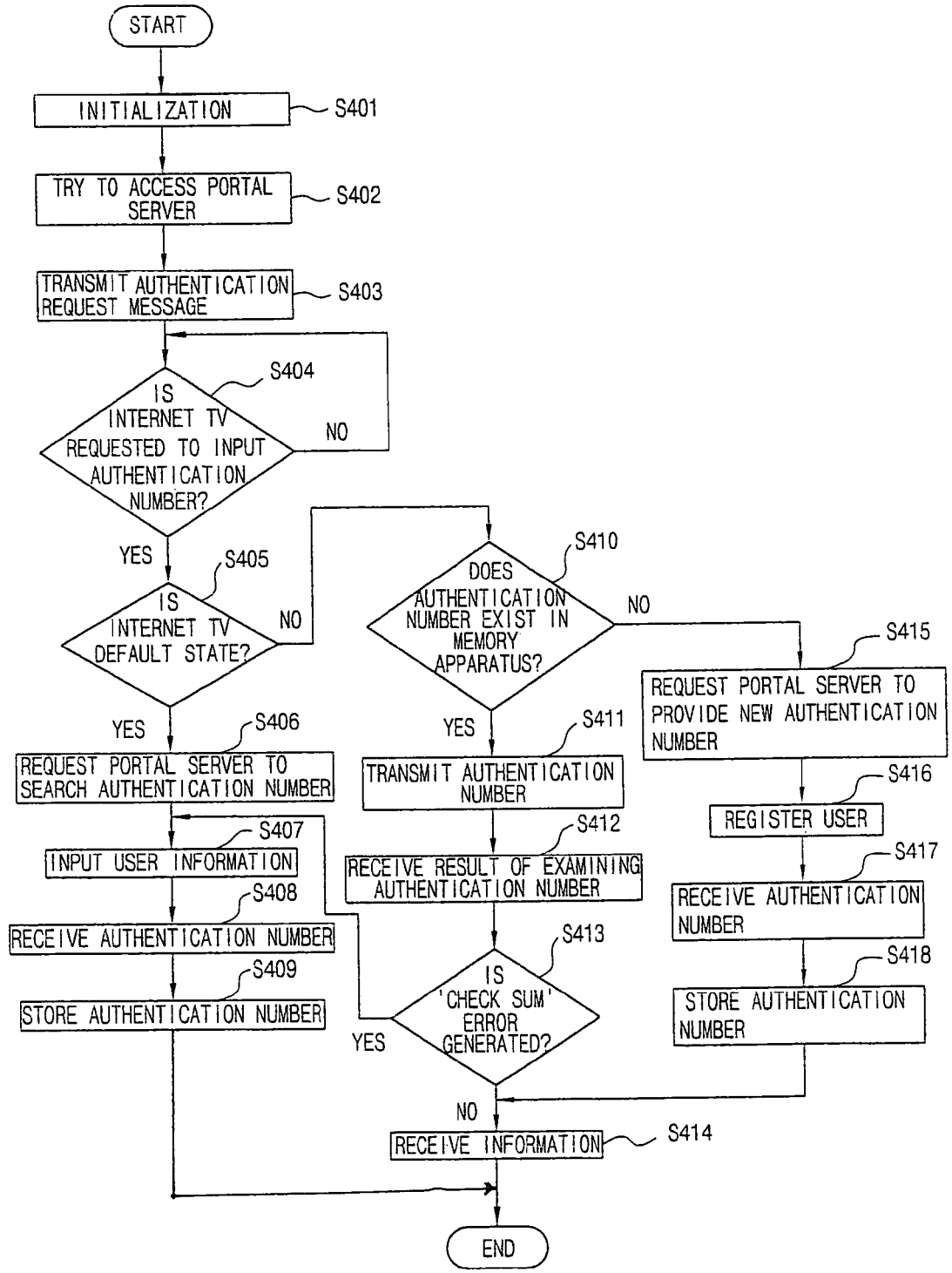
FIG. 5 is a flowchart showing the operation of the Internet TV for accessing the portal server according to the present invention.

As shown in FIG. 5, the processes of the portal server 200 allowing the Internet TV 100 to access the portal server 200 will now be described.

When the Internet TV 100 transmits an authentication request message to the portal server 200, the portal server 200 requests the Internet TV 100 to input the authentication number. The Internet TV 100 reads the authentication number from the memory apparatus built-in the Internet TV 100, transmits the authentication number to the portal server 200, and receives information. However, when the authentication number does not exist in the memory apparatus, the Internet TV newly requests the portal server to provide the authentication number, performs user registration, and receives information from the portal server 200. When the Internet TV 100 is converted into a default state after being requested to input the authentication number by the portal server 200, the Internet TV requests the portal server 200 to provide the authentication number and stores the authentication number transmitted from the portal server 200 in the memory apparatus.

When the user turns on the Internet TV 100, the Internet TV 100 drives and initializes application programs such as an operation system and a browser required for accessing the Internet and automatically tries to access the portal server 200 (S401 and S402). At this time, the Internet TV 100 transmits a message for requesting the portal server 200 to allow the Internet TV 100 to access the portal server 200 such as a message referred to as 'NT-100' created by a common gateway interface (CGI) to the portal server 200, to thus transmit information that the Internet TV 100 tries to access the portal server 200 to the portal server 200 (S403).

The Internet TV 100 checks whether the Internet TV 100 is requested to input the authentication number assigned to the Internet TV 100 by the portal server 200 and is in a stand-by state (S404). At this time, the authentication number is set as a series of numbers such as the model name, the manufacturing year, and the manufacturing month of the Internet TV 100. Therefore, when the Internet TV 100 is requested to input the authentication number by the portal server 200, the Internet TV 100 checks whether the Internet TV 100 is in the default state (S405). When it is determined that the Internet TV 100 is not in the default state, the Internet TV 100 confirms whether there exists a requested authentication number in the memory apparatus built-in the Internet TV 100 (S410). When it is determined that the requested authentication number exists, the Internet TV 100 reads the authentication number and transmits the authentication number such as a message referred to as 'URL_A?Serial=XXXXX' created by the CGI to the portal server 200 (S411). The Internet TV receives a result of examining whether there exists an error in the authentication number from the portal server 200 (S412). When it is determined that there exists the error in the authentication number, the process proceeds to step 407. When it is determined that there exists no error in the authentication number, the Internet TV receives information transmitted from the portal server 200, decodes the information, and displays the information on a monitor (not shown) (S413 and S414).

However, when the Internet TV 100 is in the default state in step 405, the Internet TV cannot receive information from the portal server 200.

Figure 2:
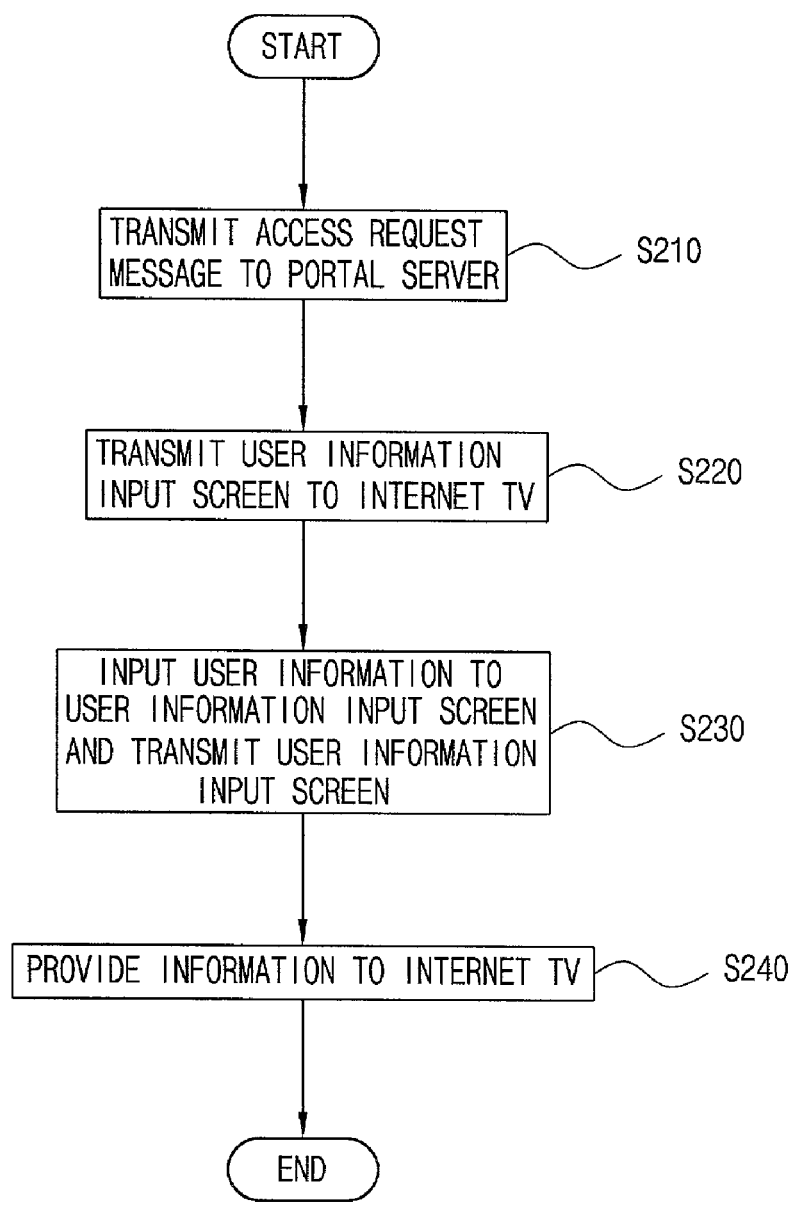
FIG. 2 is a flowchart describing a method for the Internet TV accessing a portal server according to the conventional technology.

That is, when a problem occurs in an Internet operating program, the Internet TV 100 is automatically turned to the default state. At this time, when the authentication number of the Internet TV 100 is deleted from the memory, the Internet TV 100 cannot access the portal server 200. Therefore, When the current state of the Internet TV 100 is default, the Internet TV 100 transmits a message referred to as 'URL_A?Serial=search' created by the CGI to the portal server 200, to thus request the portal server 200 to search the authentication number of the Internet TV 100 (S406), receives the conventional user information input screen shown in FIG. 2, which is transmitted from the portal server 200, from the user, and transmits the user information input screen to the portal server 200 (S407 through S409).

As mentioned above, after the Internet TV 100 transmits the user information to the portal server 200, the Internet TV 100 receives the authentication number from the portal server 200 and stores the authentication number in the memory apparatus built-in the Internet TV 100. When the user turns on the Internet TV 100 again, processes of accessing the portal server 200 proceed again.

When the authentication number does not exist in the memory apparatus like in step 410, it is determined that the user registration is not performed. Therefore, the Internet TV 100 requests the portal server 200 to provide a new authentication number (For example, the Internet TV 100 transmits a message referred to as 'URL A?Serial-new' created by the CGI to the portal server 200). (S415).

When the user information input screen transmitted from the portal server 200 is created by the user, the Internet TV 100 transmits the created user information input screen to the portal server 200. The Internet TV 100 receives the new authentication number from the portal server 200 and stores the new authentication number in the memory apparatus built-in the Internet TV 100. When the user turns on the Internet TV 100 again, the processes of accessing the portal server 200 proceed again from the beginning (S416 through S418).

According to the above-mentioned method, the Internet TV 100 receives information from the portal server 200 and displays the information on the monitor (not shown) (S414).

(Method for the Portal Server Allowing the Internet TV to Access the Portal Server)

Figure 6A:
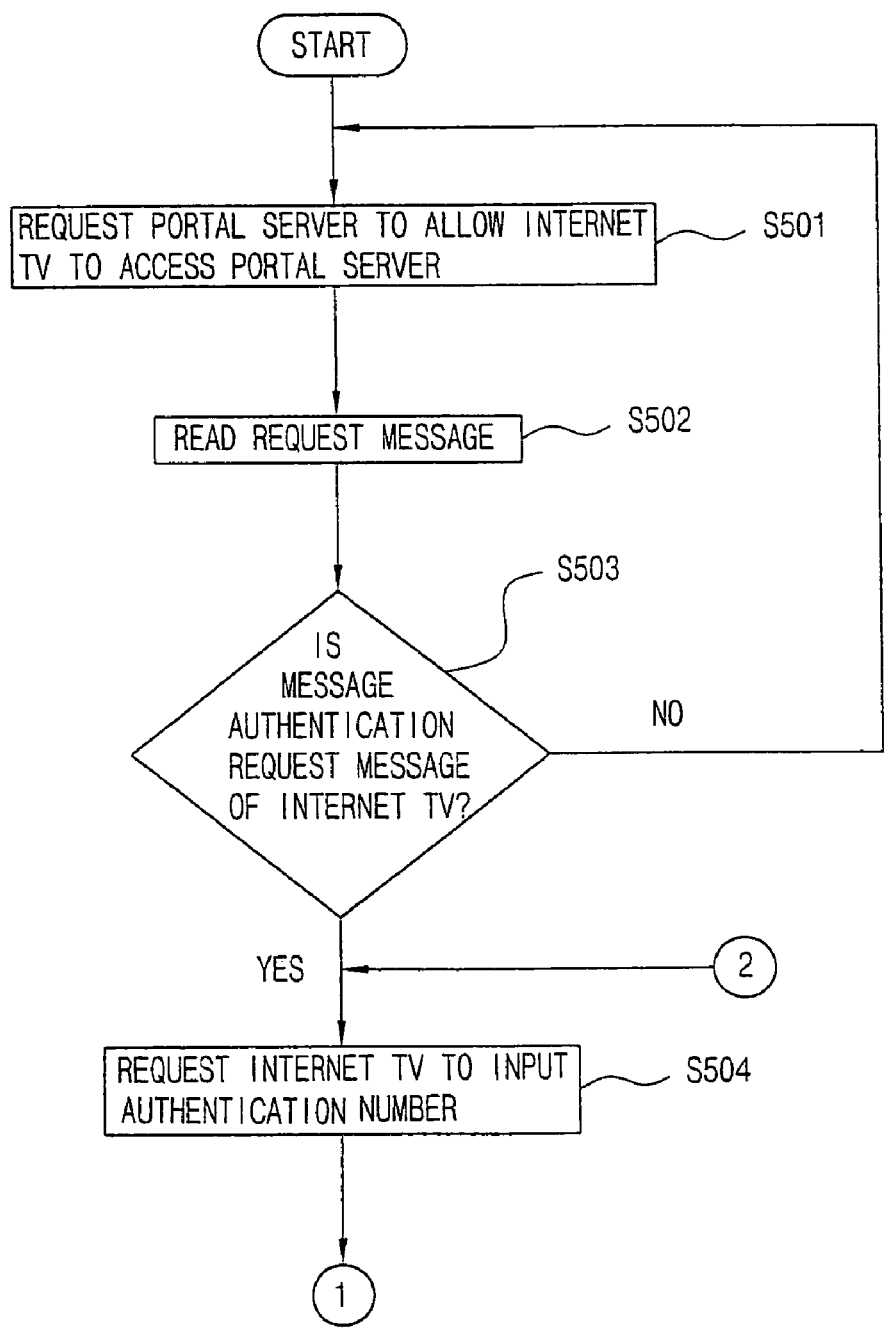
FIGS. 6A, 6B, and 6C are flowcharts showing the operations of the portal server for allowing the Internet TV to access the portal server according to the present invention.
Figure 6B:
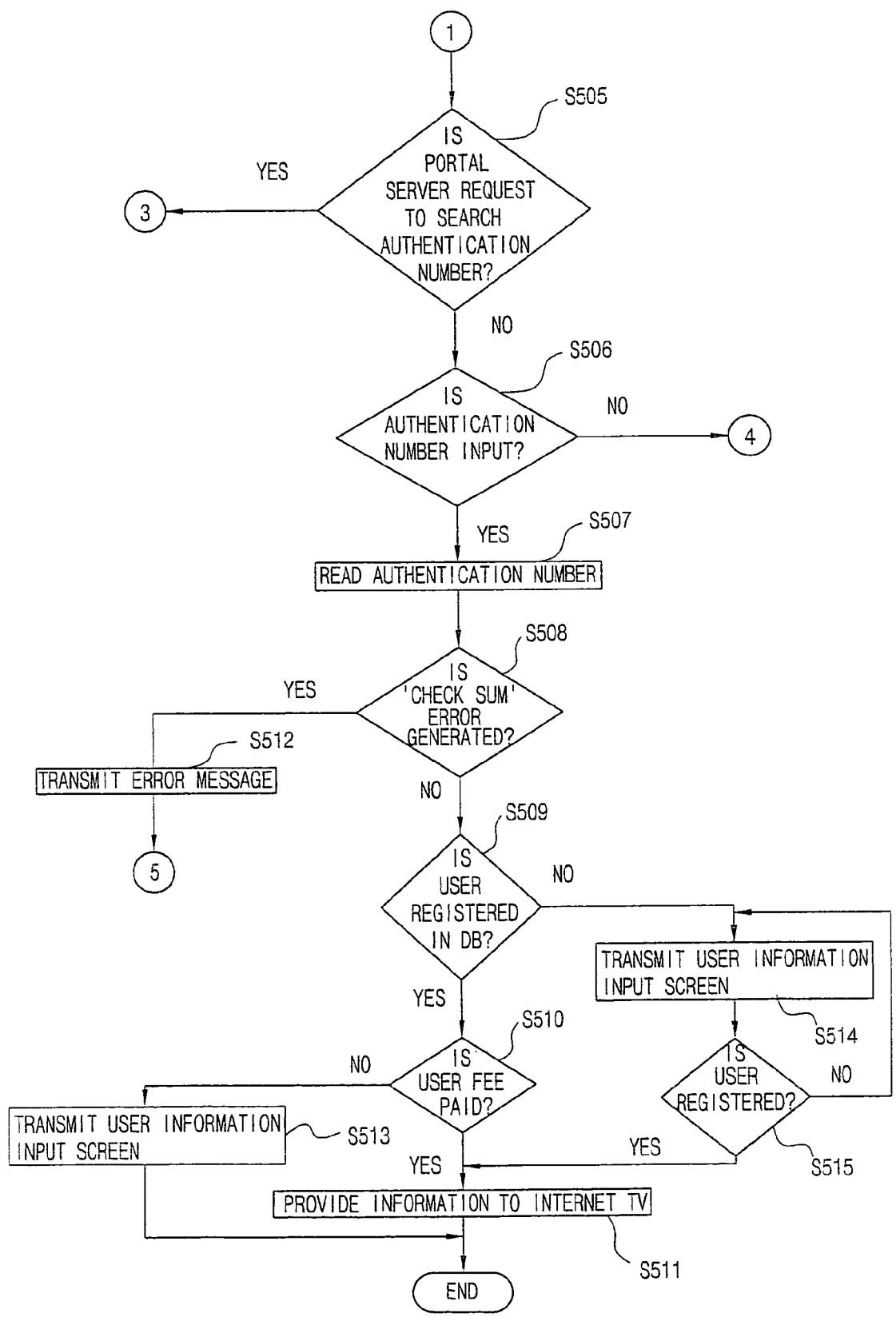
Figure 6C:
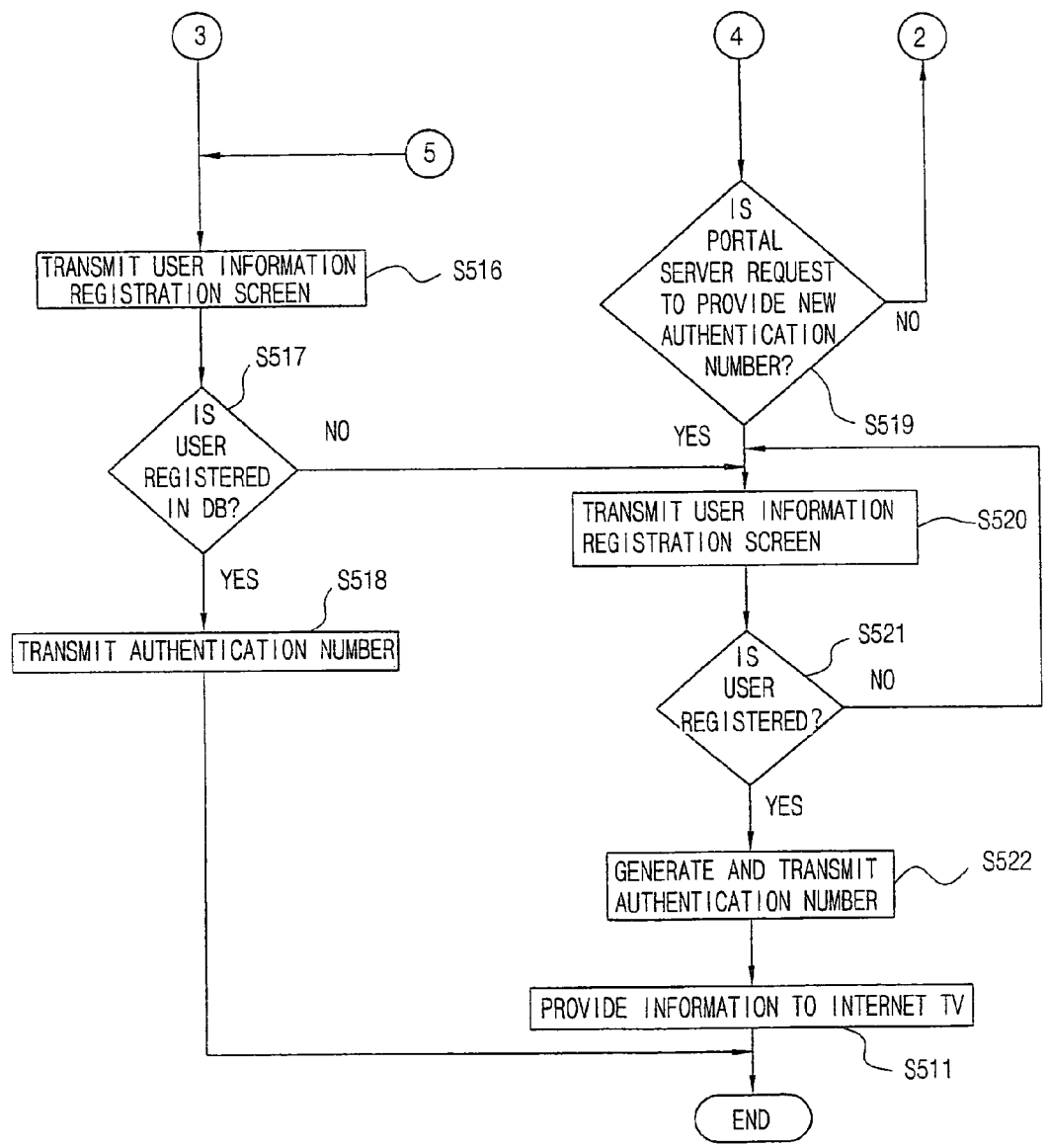

As shown in FIGS. 6A, 6B, and 6C, processes of the portal server allowing the Internet TV 100 to access the portal server 200 will now be described as follows.

When the portal server 200 is requested to allow the Internet TV to access the portal server, the portal server reads the access request message. When the access request message is transmitted from the Internet TV 100, the portal server 200 requests the Internet TV 100 to input the authentication number. When the portal server 200 requests the Internet TV 100 to input the authentication number and receives the requested authentication number, the portal server 200 examines whether there exists an error in the authentication number, that is whether the authentication number is legal and checks whether the user is registered in a database on the basis of the authentication number. When a user fee is normally paid, the portal server 200 provides information to the Internet TV 100.

That is, the portal server 200 receives the access request message when the portal server 200 is requested to allow the Internet TV to access the portal server 200 by the Internet TV 100. At this time, it is determined whether the received message is a message for the Internet TV 100 requesting the portal server 200 to allow the Internet TV 100 to access the portal server such as the 'TN-100' message created by the CGI. When the message is not for the Internet TV 100 requesting the portal server 200 to allow the Internet TV 100 to access the portal server 200, the portal server 200 is in a stand-by state until the access request message is received from the Internet TV 100. However, when the message is requested by the Internet TV, the portal server 200 requests the corresponding Internet TV 100 to input the authentication number (S501 through S504).

The portal server 200 determines whether the message transmitted from the Internet TV 100 is for requesting the portal server 200 to search the authentication number such as the message 'URL_A?Serial=search' created by the CGI (S505). When it is determined the message is not for requesting the portal server 200 to search the authentication number but the message for showing the input of the authentication number such as the message referred to as 'URL_A?Serial=XXXXX', the portal server 200 reads the message and checks whether a 'check sum' error is generated in the authentication number (S506 through S508).

Methods for the portal server 200 confirming the generation of the 'check sum' error are various. However, according to the present invention, as shown in FIG. 7, the addition of the numbers obtained by multiplying a uniform weight value by each authentication number formed of the model name, the manufacturing year, and the manufacturing month of the Internet TV 100 is divided by 10. Then, the remainder is set as the 'check sum'. When the remainder does not coincide with the 'check sum' value of the authentication number transmitted from the Internet TV 100, the 'check sum' error is generated.

Therefore, when the 'check sum' error is generated, an error message is transmitted to the Internet TV 100 (S512) and processes after step 516 are performed. However, when the 'check sum' error is not generated, it is checked whether the authentication number received from the Internet TV 100 is user registered in the database stored in the portal server 200 (S509). This process is performed in order to newly register the user of the Internet TV 100 when the authentication number is not user registered. Therefore, when the authentication number is user registered, it is checked whether the user paid the fee (S510). When the authentication number is not user registered, the portal server transmits the user information input screen to the Internet TV 100, to thus let the authentication number user registered (S514 and S515). When the user is newly registered, the portal server provides information to the Internet TV 100 (S511). Also, when it is determined that the fee is paid as a result of checking whether the user paid the fee, the portal server 200 transmits a message for informing that the fee is not paid to the Internet TV 100 (S513). When the fee is paid, the portal server 200 provides the information to the Internet TV 100 (S511).

However, when the Internet TV 100 requests the portal server 200 to search the authentication number, that is, the Internet TV 100 is in the default state after the portal server 200 requests the Internet TV 100 to input the authentication number, the portal server 200 transmits the user information input screen to the Internet TV 100.

That is, as a result of determination in step 505, when the data transmitted from the Internet TV 100 is for requesting the portal server 200 to search the authentication number such as the message referred to as 'URL_A?Serial=search' created by the CGI, the portal server 200 transmits the user information input screen to the Internet TV 100 in order to transmit the authentication number to the Internet TV 100 through the user information (S516). Therefore, the portal server 200 reads the authentication number of the corresponding Internet TV 100 in the database with reference to the user information transmitted from the Internet TV 100 and transmits the authentication number to the Internet TV 100, to thus let the Internet TV re-access the portal server 200 (S516 through S518). However, when the user is not registered in the database, the portal server 200 performs processes after step. Accordingly, the Internet TV 100 receives the authentication number, to thus let the Internet TV 100 re-access the portal server 200.

After the portal server 200 requests the Internet TV 100 to input the authentication number, when the authentication number and the message for requesting the portal server 200 to search the authentication number are not transmitted from the Internet TV 100 and a message for requesting the portal server 200 to provide the new authentication number is transmitted. The user information input screen is transmitted.

That is, as a result of determination in step 506, when the message received from the Internet TV 100 is not the authentication number and the message for requesting the portal server 200 to search the authentication number, it is determined whether the message is for requesting the portal server 200 to provide the new authentication number, for example, a message referred to as 'URL_A?Serial=new'. When the message is not for the portal server 200 to provide the new authentication number, since the message is not related to the authentication number, the portal server performs processes after step 504 again (S519). However, when the message is for requesting the portal server 200 to provide the new authentication number, the portal server 200 transmits the user information input screen to the Internet TV 100 (S519 and S520). The portal server 200 is in the stand-by state until a user registration screen is transmitted from the Internet TV 100 (S521).

When the user registration screen is received, the portal server 200 generates the authentication number of the corresponding Internet TV 100, transmits the authentication number to the Internet TV 100, and provides information to the Internet TV (S522 and S511).

As mentioned above, according to the method for accessing the Internet using the Internet TV 100 according to the present invention, the portal server 200 provides the authentication number to each Internet TV 100. Accordingly, the portal server 200 confirms the access authority of each Internet TV 100, to thus let the Internet TV 100 automatically access the portal server 200 without the user login.

Also, in the method for accessing the Internet using the Internet TV 100 according to the present invention, the fee for the use of the Internet TV 100 is not individually charged for each user. The fee is charged according to time, for which the Internet TV 100 is used.

What is claimed is:

1. A method of an Internet TV, the method comprising:
transmitting a first authentication request message to an information provider server communicatively coupled to the Internet TV during a session of the Internet TV, wherein the first authentication request message is configured to request information from the information provider server;
determining a state of the Internet TV upon receiving a first message requesting a delivery of an authentication number assigned to the Internet TV from the information provider server, wherein states of the Internet TV include a normal operation state and a default state;
deleting any authentication numbers stored in a memory device of the Internet TV and placing the Internet TV in the default state in response to detecting a problem with an Internet operating program of the Internet TV;
displaying a user interface input screen received from the information provider server when the Internet TV is in the default state, wherein the user interface input screen is configured to receive user information associated with a subscription of the information from the information provider server;
transmitting the user information to the information provider server;
requesting the information provider server to search for the authentication number in a database of the information provider server based on the transmitted user information; and
storing the authentication number in the memory device of the Internet TV upon receiving the authentication number from the information provider server.

2. The method of claim 1, further comprising:
transmitting a second authentication request message to the information provider server during a subsequent session of the Internet TV, wherein the second authentication request message is configured to request the information from the information provider server; and
determining a state of the Internet TV during the subsequent session upon receiving a second message from the information provider server requesting the authentication number.

3. The method of claim 2, further comprising:
accessing the memory device of the Internet TV to locate the authentication number when the Internet TV is in the normal operation state;
transmitting the authentication number to the information provider server upon locating the authentication number; and
receiving the information from the information provider server when the authentication number is determined to be valid by the information provider server.

4. A method of an Internet TV, the method comprising:
transmitting a first authentication request message to an information provider server communicatively coupled to the Internet TV during a session of the Internet TV, wherein the first authentication request message is configured to request information from the information provider server;
determining a state of the Internet TV upon receiving from the information provider server a first message requesting a delivery of an authentication number assigned to the Internet TV, wherein states of the Internet TV include a normal operation state and a default state;
deleting any authentication numbers stored in a memory device of the Internet TV and placing the Internet TV in the default state in response to detecting a problem with an Internet operating program of the Internet TV;
accessing the memory device of the Internet TV to locate the authentication number when the Internet TV is in the normal operation state;
displaying a user interface input screen received from the information provider server if the authentication number is unavailable from the memory device, wherein the user interface input screen is configured to receive user information associated with a subscription of the information from the information provider server;
requesting the authentication number from the information provider server based on the user information, wherein the user information is processed to register the Internet TV in a database of the information provider server; and
storing the authentication number in the memory device of the Internet TV upon receiving the authentication number from the information provider server.

5. An Internet TV apparatus, comprising:
a processor; and
a memory coupled to the processor and configured to store a set of instructions that,
when executed by the processor, causes the processor to perform a method, the method comprising:
transmitting a first authentication request message to an information provider server communicatively coupled to the Internet TV apparatus during a session of the Internet TV apparatus, wherein the first authentication request message is configured to request information from the information provider server;
determining a state of the Internet TV apparatus upon receiving from the information provider server a first message requesting a delivery of an authentication number assigned to the Internet TV apparatus, wherein states of the Internet TV apparatus include a normal operation state and a default state;
deleting any authentication numbers stored in a memory device of the Internet TV and placing the Internet TV in the default state in response to detecting a problem with an Internet operating program of the Internet TV;
displaying a user interface input screen received from the information provider server when the Internet TV apparatus is in the default state, wherein the user interface input screen is configured to receive user information associated with a subscription of the information from the information provider server;

transmitting the user information to the information provider server;

requesting the information provider server to search for the authentication number in a database of the information provider server based on the user information; and storing the authentication number in the memory device of the Internet TV apparatus upon receiving the authentication number from the information provider server.

6. A method of an information provider server, the method comprising:

receiving a first authentication request message from an internet TV communicatively coupled to the information provider server during a session of the Internet TV, wherein the first authentication request message is configured to request information from the information provider server;

forwarding a first message to the Internet TV requesting an authentication number assigned to the Internet TV;

forwarding a user interface input screen to the Internet TV when the Internet TV is in a default state, wherein states of the Internet TV include a normal operation state and a default state, and wherein the user interface input screen is configured to receive user information associated with the Internet TV;

deleting any authentication numbers stored in a memory device of the Internet TV and placing the Internet TV in the default state in response to detecting a problem with an Internet operating program of the Internet TV;

searching for the authentication number in a database of the information provider server based on the user information; and forwarding the authentication number to the Internet TV, wherein the authentication number is stored in the memory device of the Internet TV.

7. The method of claim 6, further comprising:

receiving a second authentication request message from the Internet TV during a subsequent session to the session of the Internet TV, wherein the second authentication request message is configured to request the information from the information provider server; and forwarding a second message requesting the authentication number from the Internet TV.

8. The method of claim 7, further comprising:

receiving the authentication number from the Internet TV when the Internet TV is in the normal operation state and when the authentication number is located in the memory device of the Internet TV;

determining a validity of the authentication number; and forwarding the information to the Internet TV if the authentication number is determined to be valid.

9. A method of an information provider server, the method comprising:

receiving a first authentication request message from an internet TV communicatively coupled to the information provider server during a session of the Internet TV, wherein the first authentication request message is configured to request information from the information provider server;

forwarding a first message to the Internet TV requesting an authentication number assigned to the Internet TV;

forwarding a user interface input screen to the Internet TV when the Internet TV is in a normal operation state and when the authentication number is unavailable in a memory device of the Internet TV, and wherein the user interface input screen is configured to receive user information associated with the Internet TV;

deleting any authentication numbers stored in a memory device of the Internet TV and placing the Internet TV in the default state in response to detecting a problem with an Internet operating program of the Internet TV;

registering the Internet TV in a database of the information provider server upon receiving the user information from the Internet TV; and forwarding the authentication number to the Internet TV, wherein the authentication number is stored in the memory device of the Internet TV.

* * * * *